Patented May 5, 1942

UNITED STATES PATENT OFFICE 2,281,940

COATING COMPOSITION

Robert R. Lewis, Baldwin, N. Y., assignor to Vulcan Proofing Company, Brooklyn, N. Y., a corporation of New York No Drawing. Application February 17, 1938, Serial No. 190,951

1 Claim. (Cl. 260—17)

My invention relates to a flexible membrane or covering material which will protect delicate instruments from interference or damage due to the effect of moisture or other vapor in the atmosphere. The flexible membrane will likewise resist the passage of air through said membrane. The invention consists of a textile fabric, saturated and/or coated with a flexible material which is very resistant to the transmission of moisture and gases. One of the important uses for such a membrane is in transmitters and receivers of telephone sets, particularly in the transmitter. The membrane prevents the passage of moisture into these instruments to a large degree and at the same time can be made light enough in weight and flexible enough to provide this protection against moisture without seriously interfering with the efficiency of the instrument for transmitting sound. The coating material likewise is very stable chemically and it is resistant to oxidation, and to acids and alkalies.

A number of other uses for a flexible membrane having these qualities suggest themselves such as in gas cells for holding the lifting gas in dirigibles and airships where it is important to maintain the purity of the gas; as covers for highly polished or easily corroded surfaces which must be protected from moisture or corrosive vapors, etc.

Polymerized isobutylene forms the essential part of the saturating and coating mixture. This material is available over a wide range of polymerization. For most uses I prefer to use a polymer which is similar to crude or unvulcanized rubber in physical characteristics at ordinary atmospheric conditions. This polymer is a plastic solid which can be masticated on a two-roll rubber mill, like rubber. Other compounding ingredients may be added as diluents, coloring pigments, or to alter certain characteristics such as specific gravity, surface tackiness, tensile strength, etc. This polymer, either in the pure unadulterated form or after suitable compounding, may be dissolved in suitable solvents such as gasoline, benzol or toluol for saturating or coating a base material or it may be applied by the well known calendering process. While I prefer to use the polymer of isobutylene or the like, which resembles crude rubber in consistency and in other properties, I do not intend in this disclosure to limit myself to that polymer only.

For certain application such as a moisture-proof membrane in a telephone transmitter said polymer is probably the best, but other polymers can be adapted for this use and similar uses.

Instead of using polymerized isobutylene, other polymerized iso-olefines can be used and these polymerized products can be modified by adding numerous substances thereto, as stated in French Patent No. 740,407. The product or products which I use as the base of my composition are described in "Rubber Age," New York edition, vol. 41 (1937) p. 102, and also in U. S. Patent No. 2,054,115. The product which I prefer to use is sold under the name of "Vistanex." Said product or products may be designated as a polymerized hydrocarbon (or hydrocarbons) of straight chain structure. "Vistanex" is defined in the "Standard Chemical and Technical Dictionary" by Bennett, published in 1939 by The Chemical Publishing Co. Inc., of New York, as a polymerized saturated hydro-carbon having properties intermediate between rubber and non-elastic plastics.

Because of the inherent tackiness of polymerized isobutylene or analagous material, I have found it necessary in preparing the compound for the transmitter membrane to add certain materials such as waxes and cellulose derivatives. The formula I prefer to use is the following, the proportions being by weight:

| | Parts |
|---|---|
| Polymerized isobutylene or the like, known as "Vistanex" | 100 |
| Stearic acid | 1 |
| Ethyl cellulose | 10 |
| Paraffin wax | 20 |
| Carbon black | 2 |
| | 133 |

The stearic acid and paraffin wax are examples of materials which may be added to reduce the surface adhesiveness or tackiness of the polymerized hydrocarbon, without seriously altering resistance to moisture penetration or other desirable physical and chemical characteristics. Other materials such as beeswax, carnauba wax, montan wax or ozokerite could be substituted. The proportions of the ingredients above stated may be varied. However, it will be noted that according to the formula previously stated, the composite material comprises substantially 75 per cent. of polymerized isobutylene, .8 per cent. of stearic acid, 7.5 per cent. of ethyl cellulose, 15 per cent. of paraffin wax, and 1.6 per cent. of carbon black. The proportion of the paraffin wax therefore substantially exceeds the proportion of the cellulose derivative, and the proportion of the cellulose derivative greatly exceeds the proportion of the fusible organic acid, namely, the stearic acid.

Ethyl cellulose is added further to help reduce the surface adhesiveness or surface tackiness of the composition. Other cellulose ethers or derivatives such as the cellulose nitrate, acetate, butyrate or propionate might be substituted but I prefer to use ethyl cellulose because of its flexibility, stability and wider range of solubility.

Carbon black is added only as a pigment to color the coating and to reduce light reflection. The proportion may be varied or other pigments or filters may be substituted to produce other colors without departing from this invention.

For the manufacture of a transmitter membrane it is essential that the coated fabric should be very light in weight, very flexible and very thin. It is preferable, therefore, to apply the coating composition from a solution thereof. The coating mixture or composition is prepared as follows:

The stearic acid, paraffin wax and carbon black are incorporated into the polymerized isobutylene or "Vistanex" or the like on a conventional rubber mill. This mixture is then dissolved in a solvent. The ethyl cellulose is dissolved in the same solvent, the ethyl cellulose being added after the other ingredients have been dissolved.

The entire mixture is agitated until homogeneous. I prefer to use toluol as the solvent, but other mutual solvents of isobutylene or the like and of ethyl cellulose may be used in its place, such as benzol, carbon tetrachloride or other chlorinated solvents. The stearic acid and the paraffin wax are dissolved or dispersed in said solvents.

When I refer to a solution, I include a fine dispersion.

The textile fabric base to which the coating mixture may be applied will vary depending upon the use for which the coated fabric is intended. For moisture-proof telephone transmitter membranes, I prefer to use 3 momme Habutai Japanese silk. This has a weight of approximately 0.45 oz. per square yard. "Habutai" silk identifies a certain weave and the use of a certain type of silk yarn. These are well-known trade names. The composition may be applied to any type of textile fabric, in order to impregnate said fabric, wholly or partially, or to coat said fabric, while impregnating the fabric wholly or partially. Said composition may even be applied to paper or to a web of felted fibre which could not be properly classified as paper or textile fabric. The chief function of the fabric is to supply a supporting web for the film of the composition. Said coating film may be very thin.

The coating is applied to the fabric on a conventional rubber-spreading machine, with approximately half of the coating applied to each surface. For the transmitter membrane I prefer to apply about 1.9 oz. of coating per square yard, giving a total weight for the coated fabric of about 2.30 oz. per square yard and a total thickness of about .003 inch to .0035 inch. The weight of the coating, the weight of the silk and the thickness can be varied without departing from the spirit of the invention. I have given the detailed specifications of a coated fabric which I have found suitable for use in a telephone transmitter, but the invention is not limited to such details.

After the fabric has been coated, its two surfaces are dusted with talc and it is festooned at a temperature of 200° F. for two or three hours to drive off any residual solvent.

A flexible, coated fabric such as I have described, will offer great resistance to the passage of moisture in the vapor phase. The coating is also very resistant to oxidation and to the corrosive action of acids and alkalies. It, therefore, is well adapted for use as a protective membrane or covering.

The test for tackiness of a coated fabric is made by coating the fabric on both sides, dusting the surfaces of the fabric with talc, rolling the fabric in the form of a spiral roll with the adjacent surfaces of the turns of the roll contacting with each other, and allowing the roll to stand for a week at normal temperature. If the fabric can then be unwound without any substantial adhesion between adjacent turns, the coated surface is considered substantially free from tackiness.

If fabric is coated with "Vistanex" alone, and thus treated, the contacting surfaces of the fabric will stick to each other, even after talc has been applied.

The improved formula eliminates any substantial tackiness according to the above test.

I have shown a preferred embodiment of my invention, but it is clear that numerous changes and omissions can be made without departing from its spirit.

I claim:

A coating composition consisting substantially of 100 parts of polymerized isobutylene, 1 part of stearic acid, 10 parts of ethyl cellulose, 20 parts of paraffin wax, and a pigment.

ROBERT R. LEWIS.